United States Patent [19]

Shinozaki et al.

[11] Patent Number: 5,757,148
[45] Date of Patent: May 26, 1998

[54] METHOD OF AND APPARATUS FOR STOPPING A MOTOR HAVING MAGNETIC BEARINGS

[75] Inventors: Hiroyuki Shinozaki; Hironobu Yamasaki, both of Fujisawa; Kazunari Nasa, Kawasaki, all of Japan

[73] Assignee: Ebara Corporation, Tokyo, Japan

[21] Appl. No.: 814,232

[22] Filed: Mar. 11, 1997

[51] Int. Cl.⁶ .................................................. H02P 1/54
[52] U.S. Cl. ............................ 318/107; 318/86; 318/94; 318/97
[58] Field of Search .................. 307/106, 64, 66; 318/86, 94, 97, 107

[56] References Cited

FOREIGN PATENT DOCUMENTS 4-160223  6/1992  Japan .
6-165548  6/1994  Japan .

*Primary Examiner*—William M. Shoop, Jr.
*Assistant Examiner*—Kim Lockett
*Attorney, Agent, or Firm*—Wenderoth, Lind & Ponack

[57] ABSTRACT

A motor having windings normally energizable by electric power from an AC power supply is stopped in case of an emergency such as a failure of the AC power supply. The motor has a rotor rotatably supported by magnetic bearings out of contact therewith. The windings of the motor are normally energized by a motor driver with the electric power from the AC power supply. When the AC power supply fails, a battery power supply supplies electric power to the windings of the motor to brake the rotor and also to the magnetic bearings to continuously operate the magnetic bearings. A switching controller which includes timers and logic circuit elements controls times to supply the electric power from the battery power supply to the windings of the motor and the magnetic bearings. The switching controller has timers for controlling the times.

9 Claims, 6 Drawing Sheets

METHOD OF AND APPARATUS FOR STOPPING A MOTOR HAVING MAGNETIC BEARINGS

BACKGROUND OF THE INVENTION

1. Field of the Invention

The present invention relates to a method of and an apparatus for stopping a motor having magnetic bearings, and more particularly to a method of and an apparatus for stopping, in case of an emergency such as a power supply failure, a motor whose rotor is rotatably levitated and supported by magnetic bearings out of contact therewith.

The above-mentioned motor is preferably utilized in a semiconductor manufacturing apparatus such as a spin dryer for semiconductor wafer, and a CVD (chemical Vapor Deposition) apparatus, in which dust-free semiconductor wafer rotation mechanism is adopted. Also, the motor is preferably utilized, for example, in rotation mechanism of a turbo-molecular pump, a compressor, a turbine, and a spindle of machine tool.

2. Description of the Prior Art

Magnetic bearings for levitating and supporting motor rotors out of contact therewith under magnetic attractive forces of electromagnets have recently found widespread use. Motors with their rotors supported by magnetic bearings require no maintenance for the bearings, can rotate at high speeds, and produce reduced noise because the bearings that are kept out of contact with the rotors are free of wear and do not need lubricating oil.

Such magnetic bearings are usually equipped with a battery power supply for use in case of emergencies such as a failure of a commercial AC power supply (primary power supply). When the commercial AC power supply fails to supply the AC power, the battery power supply is switched on to enable the magnetic bearings to continuously operate for levitating and supporting the rotor out of contact therewith.

If a motor whose rotor is rotatably levitated and supported by magnetic bearings is an induction motor, then the windings of the motor are usually supplied with AC power from a frequency/voltage converter such as an inverter or the like which is supplied with three-phase AC power from a three-phase commercial AC power supply. The inverter rectifies the three-phase AC power into DC power, then produces AC power from the DC power, and supplies the AC power to the windings of the motor. Heretofore, when the three-phase commercial AC power supply suffers a failure, it has been customary to switch from the three-phase commercial AC power supply to a battery power supply, which energizes the inverter to continuously operate the induction motor with the AC power supplied therefrom. In many cases, the DC power generated by the inverter from the AC power has a DC voltage which is close to the DC voltage of the battery power supply.

For increasing the performance of the motor, e.g., for increasing the rate at which the motor is accelerated, it is better to increase the voltage with which the motor is energized. Generally, it is often practiced to apply a voltage corresponding to the commercial power supply voltage to the motor. General-purpose inverters are usually not equipped with a backup function for motors in case of power supply failures.

FIG. 1 of the accompanying drawings shows a conventional apparatus for supplying electric power to a motor which has magnetic bearings. As shown in FIG. 1, a magnetic bearing cable 3 and a motor cable 5 are connected to an induction motor 1 whose rotor is rotatably levitated and supported by magnetic bearings. The magnetic bearing cable 3 and the motor cable 5 are connected through a control console 7 to a three-phase, 200-V commercial AC power supply. The control console 7 has a magnetic bearing controller 2, connected to the commercial AC power supply, which supplies a magnetic bearing control current through the magnetic bearing cable 3 to control the magnetic bearings which levitate and support the rotor out of contact therewith at a target position. The control console 7 also has a motor driver 4 which comprises a frequency/voltage converter such as a general-purpose inverter or the like that is connected to the commercial AC power supply. The motor driver 4 supplies electric power having a predetermined frequency/voltage through the motor cable 5 for operating the motor 1 at a predetermined speed. The magnetic bearing controller 2 is backed up by a battery power supply (DC power supply) 6 such as a 48-V, 2.2-Ahr battery. When the commercial AC power supply fails, the battery power supply 6 supplies DC power to the magnetic bearing controller 2 to enable the magnetic bearing controller 2 to continuously operate the magnetic bearings.

If the commercial AC power supply is subjected to a failure while the induction motor 1 is in operation, the magnetic bearings are continuously operated by the DC power supplied from the battery power supply 6. However, since the motor driver 4 is no longer supplied with the AC power from the commercial AC power supply, the rotor of the induction motor 1 rotates in a free-running condition. The rotor which is rotatably supported by the magnetic bearings usually rotates at a high speed of at least several thousands rpm. Because the rotor is magnetically kept out of contact with the magnetic bearings, the rotor does not suffer any friction force or decelerated. Consequently, it takes a long period of time, sometimes several tens minutes, until the rotor comes to a stop. Such continued rotation of the rotor, regardless of the shutdown of a load of the motor due to the power supply failure, may possibly bring about a secondary accident.

SUMMARY OF THE INVENTION

It is therefore an object of the present invention to provide a method of and an apparatus for stopping a motor having magnetic bearings within a relatively short; period of time upon a failure of a commercial AC power supply which supplies electric energy to the motor.

According to the present invention, there is provided a method of stopping a motor having a rotor rotatably supported by magnetic bearings out of contact therewith, the motor having windings normally energizable by electric power from a primary power supply, comprising the steps of supplying electric power from a battery power supply to the magnetic bearings to continuously operate the magnetic bearings upon a failure of the primary power supply, disconnecting the primary power supply from the windings of the motor, and supplying electric power from the battery power supply to the windings of the motor thereby to brake the motor.

The primary power supply is disconnected from the windings and the electric power is supplied from the battery power supply to the windings at respective times controlled by timers.

Alternatively, the primary power supply is disconnected from the windings and the electric power is supplied from the battery power supply to the windings by a switching controller in response to a signal indicative of the failure of the primary power supply.

The voltage of the electric power supplied from the battery power supply to the windings is variable by a voltage regulator connected to the battery power supply.

According to the present invention, there is also provided a method of stopping a motor energizable by a primary power supply, upon a failure of the primary power supply, the motor having a rotor rotatably supported by magnetic bearings out of contact therewith which are normally operated by a control current generated from electric power supplied from the primary power supply, comprising the steps of supplying battery power to the magnetic bearings to continuously operate the magnetic bearings, disconnecting the primary power supply from windings of the motor, and supplying battery power to the windings of the motor thereby to brake the motor.

According to the present invention, there is further provided an apparatus for stopping a motor having a rotor rotatably supported by magnetic bearings out of contact therewith, the motor having windings normally energizable by electric power from a primary power supply, comprising a motor driver for energizing the windings of the motor with electric power from the primary power supply, a battery power supply for supplying electric power to the windings of the motor and the magnetic bearings upon a failure of the primary power supply, and a switching controller for controlling times to supply the electric power from the battery power supply to the windings of the motor and the magnetic bearings.

The switching controller has timers for controlling the times.

Alternatively, the apparatus also has a detector for detecting the failure of the primary power supply, the switching controller including means for controlling the times in response to a signal from the detector.

The apparatus further includes a voltage regulator connected to the battery power supply for regulating the voltage of the electric power supplied from the battery power supply to the windings upon the failure of the primary power supply.

When the primary power supply, typically a commercial AC power supply, fails, the electric power from the battery supply is supplied to the windings of the motor. Since a direct current flows through the windings, the windings develop a DC magnetic field which applies braking forces to the rotor. The rotor can thus be brought to a rapid stop in a DC braking mode.

The supply of the electric power from the battery power supply to the motor windings upon the failure of the primary power supply is controlled by timers. After the rotor has come to a stop, the motor windings are immediately disconnected from the battery power supply, and connected to the primary power supply, without wasting the electric power of the battery power supply. The motor can be started immediately when the primary power supply recovers.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
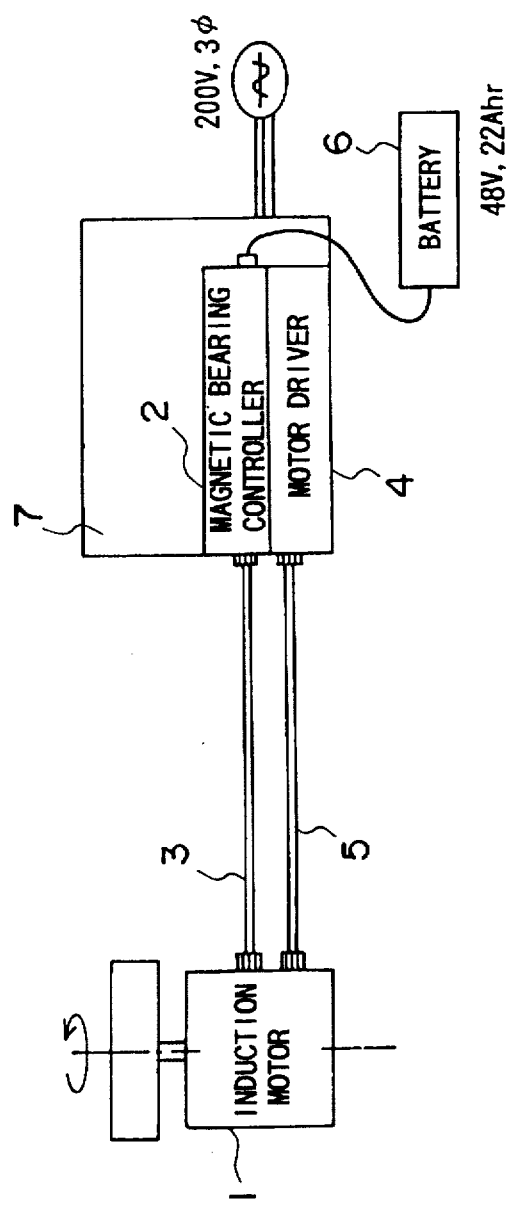
FIG. 1 is a block diagram of a conventional apparatus for supplying electric power to a motor having magnetic bearings.
Figure 2:
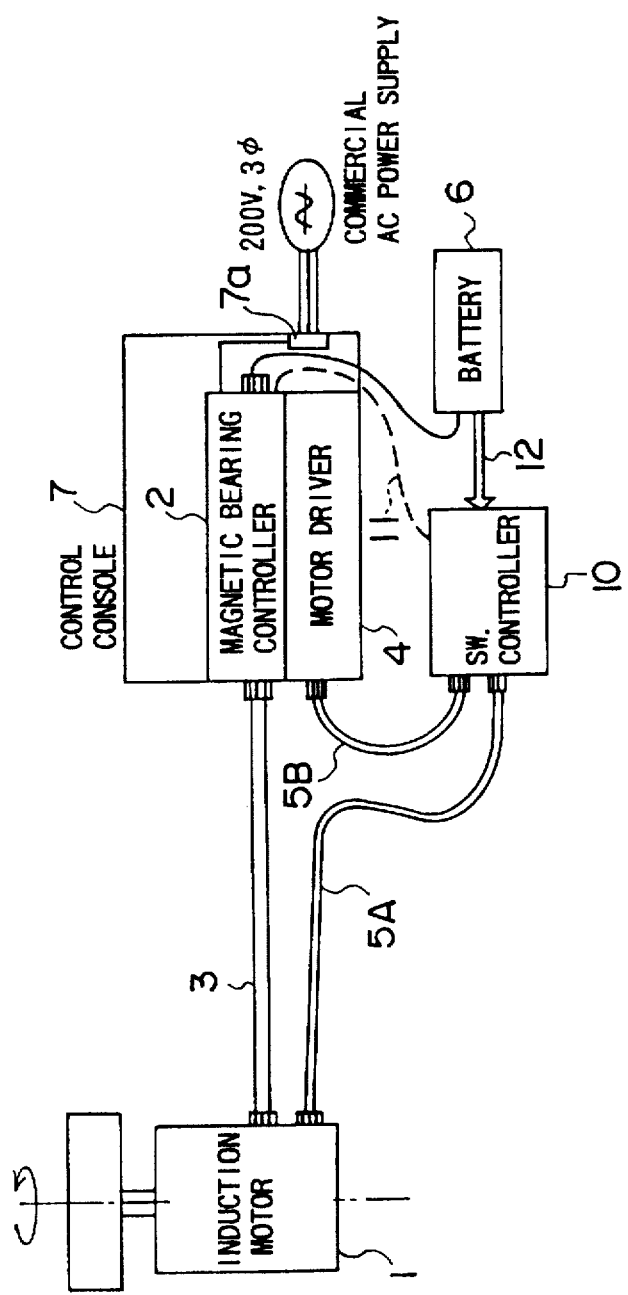
FIG. 2 is a block diagram of an apparatus for supplying electric power to a motor having magnetic bearings, to which the present invention is applied.

FIG. 2 shows in block form an apparatus for supplying electric power to a motor having magnetic bearings, to which the present invention is applied.

As shown in FIG. 2, the apparatus has a magnetic bearing cable 3 connected between an induction motor 1 and a control console 7, a motor cable 5A connected between the induction motor 1 and a switching controller 10, and a motor cable 5B connected between the switching controller 10 and the control console 7. The induction motor 1 has a rotor rotatably levitated and supported magnetically by magnetic bearings out of contact therewith. The control console 7 has a magnetic bearing controller 2, connected to a three-phase, 200-V commercial AC power supply, which supplies a magnetic bearing control current through the magnetic bearing cable 3 to control the magnetic bearings which levitate and support the rotor out of contact therewith at a target position. The control console 7 also has a motor driver 4 which comprises a frequency/voltage converter such as a general-purpose inverter or the like that is connected to the commercial AC power supply. The motor driver 4 is connected to the switching controller 10 by the motor cable 5B. The motor driver 4 supplies electric power having a predetermined frequency/voltage for operating the motor 1 at a predetermined speed. The magnetic bearing controller 2 is backed up by a battery power supply (DC power supply) 6 such as a 48-V, 2.2-Ahr battery. When the commercial AC power supply fails, the battery power supply 6 supplies DC power to the magnetic bearing controller 2 to enable the magnetic bearing controller 2 to continuously operate the magnetic bearings. The battery power supply 6 is also connected to the switching controller 10 by a cable 12. A power supply failure detection signal line 11 is connected between the magnetic bearing controller 2 and the switching controller 10. When the commercial AC power supply fails, a power supply failure detection signal is supplied from the magnetic bearing controller 2 to the switching controller 10 to operate the switching controller 10 to connect the cable 12 to the motor cable 5A. The switching controller 10 connects the motor cables 5A, 5B to each other while the commercial AC power supply is in normal operation.

While the commercial AC power supply is in normal operation, the magnetic bearing controller 2 generates a control current for controlling the magnetic bearings from the AC power supplied from the commercial AC power supply, and supplies the control current to the magnetic bearings through the magnetic bearing cable 3. Since the switching controller 10 connects the motor cables 5A, 5B to each other. AC power having a converted frequency/voltage generated by the motor driver 4 is supplied through the motor cable 5B, the switching controller 10, and the cable 5A to the windings of the induction motor 1.

When the commercial AC power supply suffers a failure, a power supply failure detector 7a sends a power supply failure detection signal to the magnetic bearing controller 2. In response to the power supply failure detection signal, a control box in the magnetic bearing controller 2 switches from the commercial AC power supply to the battery power supply 6 for continuously operating the magnetic bearings. The power supply failure detection signal is also sent from the magnetic bearing controller 2 through the power supply failure detection signal line 11 to the switching controller 10. In response to the power supply failure detection signal, the switching controller 10 connects the motor cable 5A to the cable 12 and disconnects the motor cable 5B from the motor cable 5A. Therefore, the DC power from the battery power supply 6 is supplied through the cable 12, the switching controller 10, and the motor cable 5A to the windings of the induction motor 1.

Figure 3:
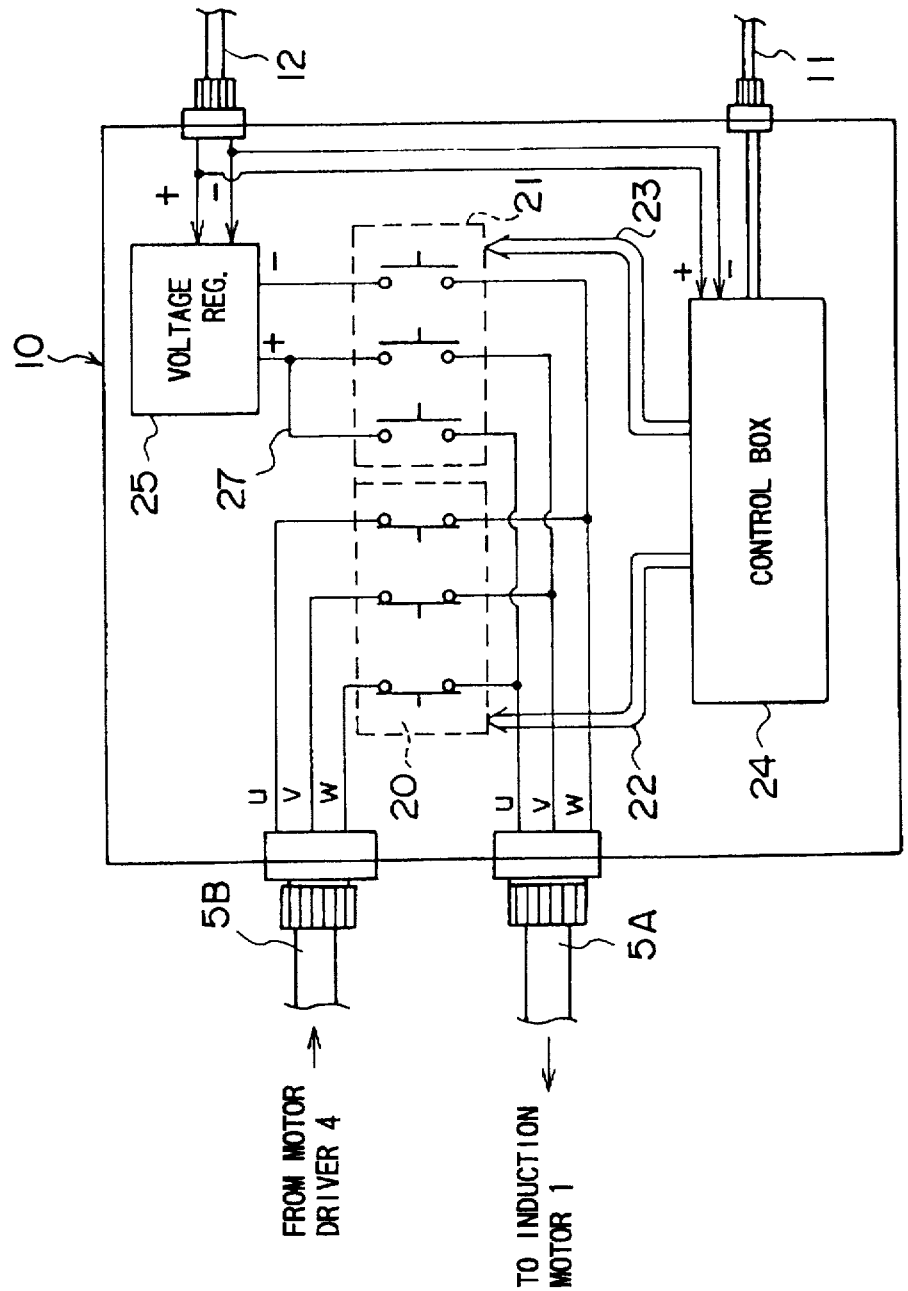
FIG. 3 is a schematic view showing an internal structure of a switching controller in the apparatus shown in FIG. 2.

FIG. 3 shows an internal structure of the switching controller 10. As shown in FIG. 3, the switching controller 10 has switching relays 20, 21. The switching relay 20 is of the normally closed type, and the switching relay 21 is of the normally open type. While the commercial AC power supply is in normal operation, the switching relay 20 is closed, i.e., it connects U, V, W terminals of the motor cable 5B to respective U, V, W terminals of the motor cable 5A. Therefore, the AC power from the motor driver 4 is supplied through the motor cable 5B, the switching relay 20, and the motor cable 5A to the windings of the induction motor 1. When the commercial AC power supply suffers a failure, a power supply failure detection signal is applied from the power supply failure detection signal line 11 to a control box 24. The control box 24 sends a control signal over a signal line 22 to open the switching relay 20, i.e., to disconnect the U, V, W terminals of the motor cable 5A from the respective U, V, W terminals of the motor cable 5B.

The switching relay 21 is open while the commercial AC power supply is in normal operation. When a power supply failure detection signal is applied to the control box 24, the control box 24 sends a control signal over a signal line 23 to close the switching relay 21, connecting the U, V, W terminals of the motor cable 5A to a voltage regulator 25. The voltage regulator 25 is supplied with the DC power from the battery power supply 6 through the cable 12, and increases or reduces the voltage of the supplied DC power to a voltage indicated by the control box 24, and supplies the regulated DC power to the induction motor 1 through the switching relay 21 and the motor cable 5A to the windings of the induction motor 1. When supplied with the DC power, the induction motor 1 is braked as described later on.

The voltage regulator 25 has positive and negative output terminals which can be connected respectively to the V and W terminals of the motor cable 5A, the positive terminal being connected through a line 27 to the U terminal of the cable 5A. However, the induction motor 1 can sufficiently be braked even if the line 27 is dispensed with. If the switching controller 10 is to be simplified in its circuit arrangement, then the line 27 may be dispensed with.

Figure 4:
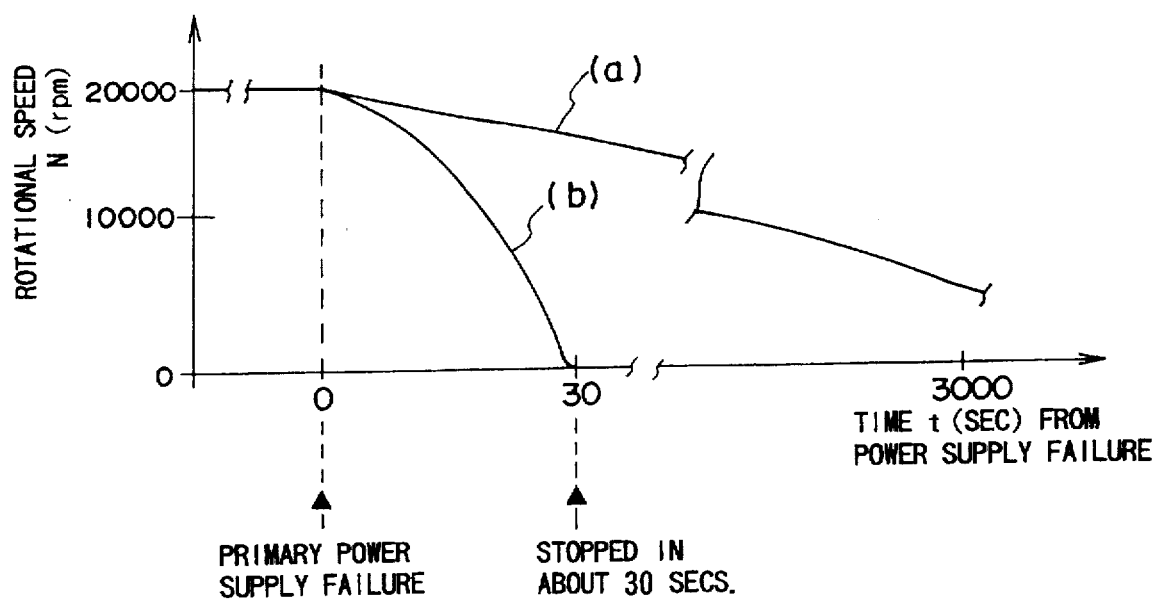
FIG. 4 is a graph showing how a motor having magnetic bearings is brought to a stop upon a power supply failure in a conventional free-running mode and a DC braking mode according to the present invention.

FIG. 4 is a graph which shows how a motor having magnetic bearings is brought to a stop upon a power supply failure in a conventional free-running mode and a DC braking mode according to the present invention. The graph shown in FIG. 4 has a horizontal axis representing time (seconds) which has elapsed from the power supply failure, and a vertical axis representing the rotational speed N (rpm) of the motor. The curve (a) shows the manner in which the motor is brought to a stop upon a power supply failure in the conventional free-running mode. The curve (b) shows the manner in which the motor is brought to a stop upon a power supply failure in the DC braking mode in which the motor is braked by supplied DC power. According to the free-running mode indicated by the curve (a), since the rotor of the motor is supported by the magnetic bearings out of contact therewith, the rotor is not subjected to frictional or sliding forces which would otherwise be imposed by usual mechanical bearings. Consequently, the rotor rotates in a free-running condition. If the rotational speed of the rotor prior to the power supply failure is about 20000 rpm, for example, then it takes a long period of time, at least 3000 seconds, before the rotor stops. According to the DC braking mode indicated by the curve (b), the windings of the motor are supplied with the DC power when the power supply failure is detected. Since the DC current flows through the windings of the motor, they generate a DC magnetic field which applies braking forces to the rotor. In the DC braking mode, the rotor can be braked to a rapid stop in about 30 seconds from the high-speed rotation, for example, at 20000 rpm.

Figure 5:
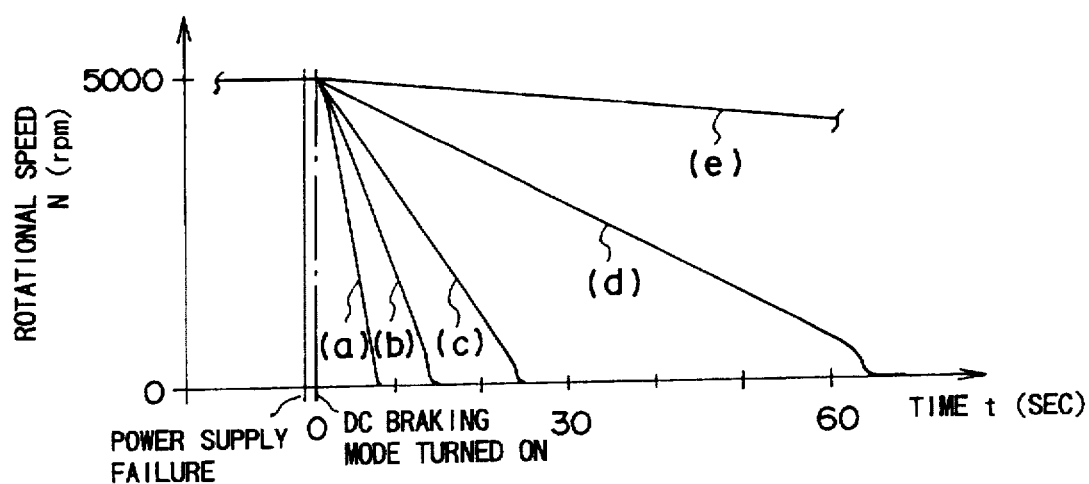
FIG. 5 is a graph showing how a motor having magnetic bearings is brought to a stop upon a power supply failure in the DC braking mode at various DC voltages.

FIG. 5 shows how a motor having magnetic bearings is brought to a stop upon a power supply failure in the DC braking mode at various DC voltages. The graph shown in FIG. 5 has a horizontal axis representing time (seconds) which has elapsed from the power supply failure, and a vertical axis representing the rotational speed N (rpm) of the motor. The power supply failure occurs while the rotor is rotating at a speed of 5000 rpm. Upon the power supply failure, the rotor is braked to a stop in the DC braking mode according to the curves (a), (b), (c), (d) at the respective DC voltages of 48 V, 36 V, 24 V, 12V which are applied to the windings of the motor. When no DC voltage is applied, the rotor coasts to a stop in a free-running condition as indicated by the curve (e). It can be seen from FIG. 5 that the braking effect on the induction motor 1 varies greatly if the DC voltage applied to the windings of the induction motor 1 is varied by the voltage regulator 25 in the switching controller 10 upon the power supply failure. When the DC voltage applied to the windings is as high as 48 V, the motor can be braked to a stop from the rotation at several thousands rpm within about 10 seconds. Such a braking capability is greatly different from the coasting of the motor in the free-running mode according to the curve (e).

Figure 6:
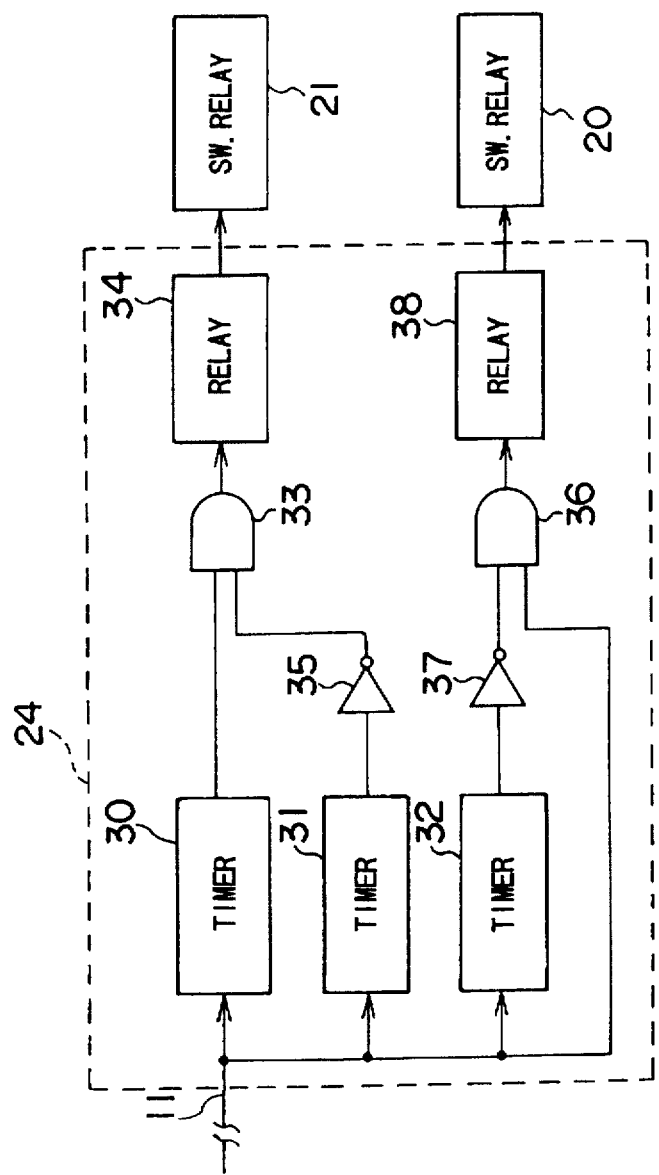
FIG. 6 is a block diagram of a switching timing control unit in a control box in the switching controller shown in FIG. 3.

FIG. 6 shows in block form a switching timing control unit in the control box 24 in the switching controller 10. The switching timing control unit shown in FIG. 6 serves to energize the switching relays 20, 21 shown in FIG. 3. The switching timing control unit has an input terminal connected to the power supply failure detection signal line 11. The switching timing control unit also has timers 30, 31, 32 which operate in various combinations to open and close the switching relays 20, 21 as described below. The timer 30 has an output terminal connected to an input terminal of an AND gate 33 whose output terminal is connected to a relay 34 which is connected to the switching relay 21. The timer 31 has an output terminal connected through an inverter 35 to another input terminal of the AND gate 33. The timer 32 has an output terminal connected through an inverter 37 to an input terminal of an AND gate 36 whose output terminal is connected to a relay 38 which is connected to the switching relay 20. The power supply failure detection signal line 11 is connected to input terminals of the timers 30, 31, 32 and also connected to another input terminal of the AND gate 36.

Figure 7:
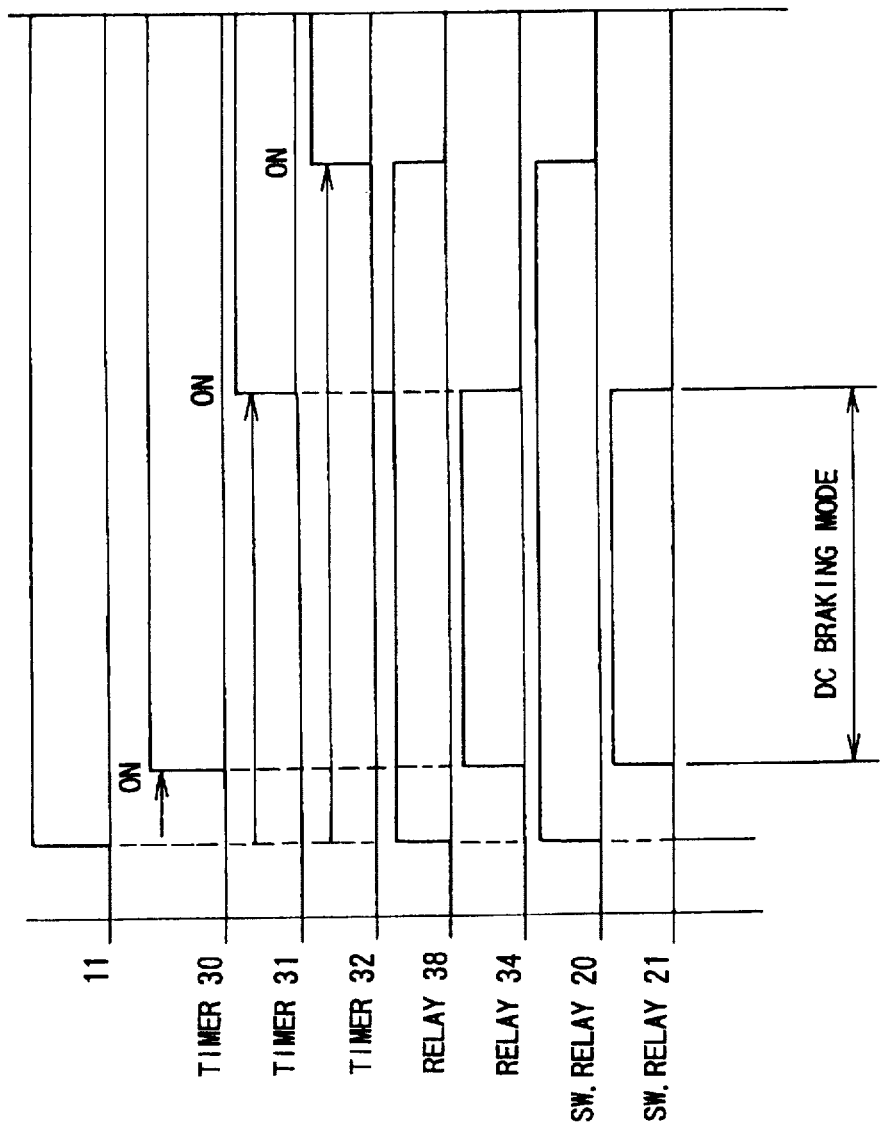
FIG. 7 is a timing chart of a switching timing pattern according to the switching timing control unit shown in FIG. 6.

FIG. 7 shows a switching timing pattern according to the switching timing control unit shown in FIG. 6. As shown in FIG. 7, when a power supply failure detection signal indicated by "H" is inputted from the power supply failure detection signal line 11, all the timers 30, 31, 32 start measuring time, but remain turned off. The power supply failure detection signal and an output signal from the inverter 37 cause the AND gate 36 to apply an output signal to turn on the relay 38, thereby opening the switching relay 20 to disconnect the motor cable 5B from the motor driver 4. When the timer 30 reaches timeout after the power supply failure detection signal is inputted, the timer 30 is turned on. Since the timer 31 still remains turned off, an output signal from the timer 30 and an output signal from the inverter 35 cause the AND gate 33 to apply an output signal to turn on the relay 34, thereby closing the switching relay 21. Now, the DC power from the battery power supply 6 is supplied through the voltage regulator 25, the switching relay 21, and the motor cable 5A to the windings of the induction motor 1. Thus, the induction motor 1 is braked to a rapid stop in the DC braking mode. Since the induction motor 1 can be brought to a stop within about 10 seconds at maximum from the beginning of an emergency such as a power supply failure, the safety of a facility or plant which incorporates the induction motor 1 can be increased.

When the timer 31 thereafter reaches timeout, it is turned on, turning off the AND gate 33. Therefore, the relay 34 is turned off, opening the switching relay 21 which disconnects the motor cable 5A from the voltage regulator 25. The DC braking mode is canceled. The timer 31 may be turned on before reaching a perfect stop of the motor. When the timer 32 subsequently reaches timeout, it is turned on, turning off the relay 38 which closes the switching relay 20. The motor cable 5B from the motor driver 4 is now connected to the motor cable 5A connected to the induction motor 1. In the event of a subsequent recovery of the commercial AC power supply, consequently, the induction motor 1 can immediately be started.

In the above embodiment, the motor having magnetic bearings which is to be stopped in the DC braking mode has been described as an induction motor. However, the principles of the present invention are also applicable to a synchronous motor of the reluctance or permanent magnet type. While the battery power supply for the magnetic bearings is used also as a battery power supply for stopping the motor in an emergency in the illustrated embodiment, a separate battery power supply for stopping the motor in an emergency may be employed in addition to the battery power supply for the magnetic bearings. Furthermore, a microcomputer or another control circuit, rather than the timers, may be used to control the opening and closing the switching relays.

Although a certain preferred embodiment of the present invention has been shown and described in detail, it should be understood that various changes and modifications may be made therein without departing from the scope of the appended claims.

What is claimed is:

1. A method of stopping a motor having a rotor rotatably supported by magnetic bearings out of contact therewith, the motor having windings normally energizable by electric power from a primary power supply, comprising the steps of:

supplying electric power from a battery power supply to the magnetic bearings to continuously operate the magnetic bearings upon a failure of the primary power supply; and supplying electric power from the battery power supply to the windings of the motor thereby to brake the motor, said electric power being supplied from the battery power supply to said windings at respective times controlled by timers.

2. A method according to claim 1, wherein the primary power supply is disconnected from said windings and the electric power is supplied from the battery power supply to said windings by a switching controller in response to a signal indicative of the failure of the primary power supply.

3. A method according to claim 1, wherein the voltage of the electric power supplied from the battery power supply to said windings is variable by a voltage regulator connected to said battery power supply.

4. An apparatus for stopping a motor having a rotor rotatably supported by magnetic bearings out of contact therewith, the motor having windings normally energizable by electric power from a primary power supply, comprising:

a motor driver for energizing the windings of the motor with electric power from the primary power supply;

a battery power supply for supplying electric power to said windings of the motor and the magnetic bearings upon a failure of the primary power supply; and a switching controller for controlling times to supply the electric power from the battery power supply to said windings of the motor.

5. An apparatus according to claim 4, further comprising a detector for detecting the failure of the primary power supply, and said switching controller including means for controlling for supplying electric power from the battery power supply to said windings of the motor in response to a signal from said detector.

6. An apparatus according to claim 4, further comprising a voltage regulator connected to the battery power supply for regulating the voltage of the electric power supplied from the battery power supply to said windings upon the failure of the primary power supply.

7. A semiconductor manufacturing equipment having said apparatus as claimed in claim 4.

8. A semiconductor manufacturing equipment having said apparatus as claimed in claim 5.

9. A semiconductor manufacturing equipment having said apparatus as claimed in claim 6.

* * * * *

UNITED STATES PATENT AND TRADEMARK OFFICE
CERTIFICATE OF CORRECTION

PATENT NO. : 5,757,148
DATED : May 26, 1998
INVENTOR(S) : Hiroyuki SHINOZAKI et al.

It is certified that error appears in the above-indentified patent and that said Letters Patent is hereby corrected as shown below:

On the title page, the foreign priority information has been omitted. Such foreign priority information should read:

--Foreign Application Priority Data

Mar. 13, 1996  [JP] Japan ................ 8-84584--.

Signed and Sealed this

Sixteenth Day of March, 1999

Attest:

Q. TODD DICKINSON

Attesting Officer

Acting Commissioner of Patents and Trademarks